(12) United States Patent
Chinnakaruppan et al.

(10) Patent No.: US 10,112,278 B2
(45) Date of Patent: Oct. 30, 2018

(54) POLISHING A CERAMIC COMPONENT USING A FORMULATED SLURRY

(71) Applicant: Apple Inc., Cupertino, CA (US)

(72) Inventors: Palaniappan Chinnakaruppan, Cupertino, CA (US); Srikanth Kamireddi, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/984,275

(22) Filed: Dec. 30, 2015

(65) Prior Publication Data

US 2017/0087683 A1  Mar. 30, 2017

Related U.S. Application Data

(60) Provisional application No. 62/232,777, filed on Sep. 25, 2015.

(51) Int. Cl.
  *B24B 1/00*  (2006.01)
  *C09K 3/14*  (2006.01)
  *B44C 1/22*  (2006.01)

(52) U.S. Cl.
  CPC ............... *B24B 1/00* (2013.01); *B44C 1/227* (2013.01); *C09K 3/1454* (2013.01)

(58) Field of Classification Search
  CPC .......... B24B 1/00; B44C 1/227; C09K 3/1454
  See application file for complete search history.

(56) References Cited

U.S. PATENT DOCUMENTS

| 6,152,805 A * | 11/2000 | Takahashi ............ B24B 31/116 451/104 |
| 2006/0196849 A1* | 9/2006 | Moeggenborg ..... B24B 37/0056 216/88 |
| 2009/0098807 A1* | 4/2009 | Bakshi .................... C09G 1/02 451/36 |
| 2010/0068524 A1* | 3/2010 | Dumm .................. C01B 25/165 428/403 |
| 2012/0261339 A1* | 10/2012 | Brummer ............. B01D 61/142 210/636 |
| 2012/0289126 A1* | 11/2012 | Tanikella .......... H04L 29/12028 451/41 |
| 2013/0037515 A1* | 2/2013 | Hosoi ...................... C09G 1/02 216/53 |

* cited by examiner

*Primary Examiner* — Duy Vu N Deo
(74) *Attorney, Agent, or Firm* — Dorsey & Whitney LLP

(57) ABSTRACT

A ceramic component and methods for making a ceramic component are disclosed. In particular, a sapphire component may be polished by positioning a compliant pad adjacent to a surface of the sapphire component. An abrasive slurry may be disposed or introduced between the compliant pad and the surface. The compliant pad may be moved with respect to the surface to produce a polished surface. The abrasive slurry may include a liquid component having a high pH level and medium-sized abrasive particulates.

20 Claims, 5 Drawing Sheets

POLISHING A CERAMIC COMPONENT USING A FORMULATED SLURRY

CROSS-REFERENCE TO RELATED APPLICATION

This application is a non-provisional patent application of and claims the benefit to U.S. Provisional Patent Application No. 62/232,777, filed Sep. 25, 2015, and titled "Polishing a Ceramic Component Using a Formulated Slurry," the disclosure of which is hereby incorporated herein by reference in its entirety.

FIELD

The described embodiments relate generally to techniques for manufacturing ceramic components and, more particularly, relate to systems and methods for treating the surface of a ceramic component using a formulated abrasive slurry.

BACKGROUND

Corundum is a crystalline form of aluminum oxide and may be found in various colors, many of which are generally referred to as sapphire. In general, sapphire is a hard and strong material with a hardness of 9.0 on the Mohs scale, and, as such, is capable of scratching nearly all other minerals. Because of its hardness and strength, sapphire may be an attractive alternative to other translucent materials like polycarbonate. However, due in part to its inherent properties, manufacturing components out of sapphire may be difficult in high-volume manufacturing conditions. In particular, sapphire's hardness makes polishing the material both difficult and time-consuming.

SUMMARY

Some example embodiments are directed to a method of polishing a ceramic (e.g., sapphire) component. A compliant pad may be positioned adjacent to a surface of the sapphire component. An abrasive slurry may be introduced to the surface. The abrasive slurry may ultimately be disposed between the compliant pad and the surface. The compliant pad and the ceramic component may be moved with respect each other to produce a polished surface. In some cases, the compliant pad may be moved with respect to the surface to produce the polished surface. The abrasive slurry may include a liquid component having a pH level greater than 10, and an abrasive particulate formed from a material having a hardness greater than the sapphire component. The liquid component may have a pH level less than 11.5. In some cases, the liquid component softens the surface of the sapphire component. The abrasive particulates may have a size ranging between 100 and 300 nanometers. In some embodiments, the compliant pad is formed from an elastic material.

In some embodiments, the abrasive particulates include diamond particles. In some embodiments, the abrasive particulates may include star-shaped particles. The stars-shaped particles include multiple protrusions that extend outwardly from a base portion. The abrasive particulates may be coated with a metallic coating. The metallic coating may reduce particle adhesion and thereby maintain suspension of the abrasive particulate within the slurry.

In some embodiments, the liquid component includes one or both of a potassium hydroxide solution or a sodium hydroxide solution.

Some example embodiments are directed to a method of manufacturing a cover for an electronic device. The method may include providing an abrasive slurry over a portion of a surface of the cover to produce a polished surface. The abrasive slurry may include abrasive particulates ranging in size between 100 and 300 nanometers, and a liquid component having a basic pH level that softens the surface of the cover.

In some embodiments, the method includes cutting a brick of sapphire material from a synthetic boule and slicing a sheet of sapphire material from the brick. In some cases, the method also includes lapping the sheet of sapphire material before the abrasive slurry is provided over a portion of the surface of the cover. In some cases, the polished surface is substantially free of surface scratches. The polished surface may form an exterior surface of the electronic device.

In some embodiments, the abrasive slurry is forced over the portion of the surface by a pad that is moved relative to the cover. The pad may be translated in a reciprocating motion over the surface of the cover.

Some example embodiments are directed to a method of polishing a sapphire component. An abrasive slurry may be provided between a pad and a surface of the sapphire component. The sapphire component and the pad may be moved with respect to each other. In some cases, the pad may be moved to force the abrasive slurry across at least a portion of the surface to produce a polished surface. In some cases, the abrasive slurry includes an abrasive particulate coated with a metallic coating and a softening agent configured to soften the surface of the sapphire component.

In some embodiments, the method further comprises aggregating sapphire particulate suspended in the abrasive slurry to form sapphire particle clusters. The abrasive slurry may be filtered to remove the sapphire particle clusters. In some cases, aggregation of the sapphire particulate may be performed by or due to a surfactant in the abrasive slurry. Aggregation of the sapphire particulate may also be performed by or due to a coagulant in the abrasive slurry.

Some example embodiments abrasive slurry for polishing a ceramic component that includes an abrasive particulate comprising diamond particles ranging in size between 100 and 300 nanometers, and a liquid component having a basic pH level greater than 10. The liquid component may have a pH level less than 11.5. The liquid component may be configured to soften a surface of the ceramic component to be polished. In some embodiments, the abrasive particulates are star-shaped particulate elements. The abrasive particulates may have a metallic coating. The metallic coating may reduce particle adhesion to maintain particulate suspension within the abrasive slurry.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
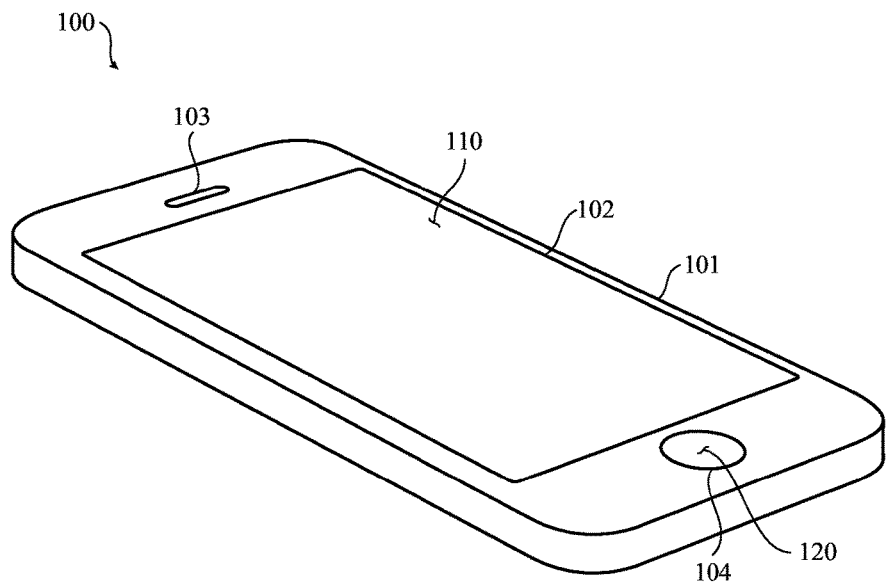
FIG. 1A depicts a top view of an example electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to methods for treating the surface of a ceramic component. The ceramic component may be formed from a transparent ceramic material, such as zirconia, sapphire, or other similar material. Numerous consumer and non-consumer devices utilize protective coverings, windows, and/or surfaces formed from hard materials, including various transparent ceramic materials. Compared to other optically clear materials, such as polycarbonate, hard ceramic materials like sapphire offer improved strength and fracture toughness. However, as previously mentioned, sapphire may be difficult to polish using traditional techniques.

As described with respect to embodiments herein, a surface treating or polishing process may be performed on a surface of the sapphire component to remove rough scratches and surface imperfections. The polishing process may remove marking from a previous sawing operation and, in some case, may perform the final surface polishing on the component. Advantages of some embodiments described herein include improved surface finish and reduced time to perform the surface treatment.

The surface treatment process may include the application of an abrasive slurry having both a particulate and a pH level that are configured to produce a smooth polished surface in a time that may be significantly reduced as compared to some traditional polishing techniques. The improved technique may include use of a high-pH level or basic slurry having a medium-sized abrasive particulate. The high-pH level or basic slurry may soften the sapphire to improve the effectiveness of the abrasive particulate and accelerate the removal of material. The softened sapphire may also be less susceptible to pitting or additional damage that may be created by the medium-sized abrasive particulate. In some cases, the increased pH level of the slurry enables the use of larger-sized particulates and/or harder materials, which may further accelerate the removal of material. In some cases, the abrasive particulate is formed from a material that is harder than the ceramic being polished, such as diamond or alumina.

Some embodiments include a specially formulated slurry that may be reused or recirculated due to improved particulate suspension properties. For example, in some embodiments, the abrasive particulate may include diamond particles that are metallized or coated with a metal or metallic material that reduces particle adhesion to improve the suspension properties of the abrasive particulates. The slurry may also include use of surfactants and/or coagulating agents that may cause sapphire particulate (formed due to material removal during the surface polishing) to form into larger clumps or aggregate groups that may be separated from the slurry more readily.

These and other embodiments are discussed below with reference to FIGS. 1A-5. However, those skilled in the art will readily appreciate that the detailed description given herein with respect to these Figures is for explanatory purposes only and should not be construed as limiting.

Figure 1B:
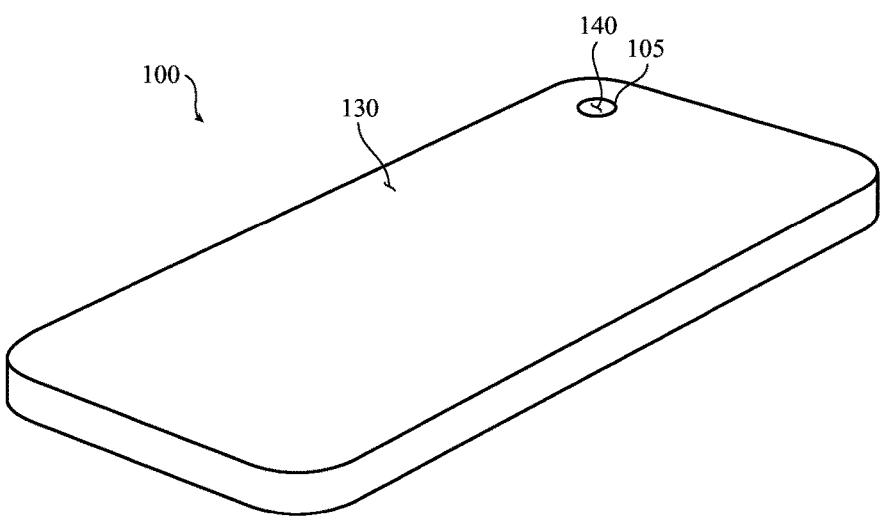
FIG. 1B depicts a bottom view of the example electronic device of FIG. 1A.

FIGS. 1A-1B depict an example electronic device having one or more ceramic components that are finished using the abrasive slurry-based surface treatment briefly described above. In some cases, the ceramic components may be formed using a process that provides manufacturing advantages and/or an improved surface finish as compared to some traditional surface treatment techniques. A more detailed description of an example surface treatment is also provided below with respect to FIG. 5.

FIGS. 1A-1B depict a device 100 having multiple protective sheets that are formed from a ceramic material, such as sapphire. While the following examples are provided with respect to protective sheets formed from a sapphire component, other ceramic materials may also be used, including, for example, various forms of glass, zirconia, and the like. The ceramic component may be transparent if used to protect a visible or optical component, such as a display screen or camera. In some cases, the ceramic component may not be transparent and may be partially or completely opaque.

In the present example, the protective sheets are formed from one or more sapphire components, which may provide outstanding wear resistance and enhance the mechanical integrity of the device. A protective sheet may also function as an optically transmissive window and provide visibility to underlying components, such as displays or graphical elements. In many implementations, both the optical and mechanical properties of the protective sheets may be important to perception of quality and performance of the device.

It may be desirable for the surfaces of the protective sheets to have a smooth or highly polished surface that is free from perceptible or visible defects, dislocations, or regions of non-uniformity. It may be advantageous that the ceramic component include at least one polished surface having a shiny, smooth optical appearance and a smooth tactile feel. In some implementations, the polished surface may be smooth and shiny with specular reflective properties. In some cases, the polished surface may have a very smooth polished surface but may otherwise be treated with coatings or other surface treatments to reduce the specular reflection without increasing the surface roughness or texture of the surface.

A highly polished surface may be particularly advantageous for components that form an optically transparent cover. As shown in FIG. 1A, the device 100 includes a protective cover sheet 110 formed from a sapphire component and may be used as an optically transmissive protective layer. The cover sheet 110 may also be attached to or otherwise disposed above the display 102, which may protect the display 102 from scratches or other physical damage. The cover sheet 110 may be attached to an enclosure 101 of the device 100 using an optically transmissive adhesive or other bonding technique. In one example, the cover sheet 110 is attached to the enclosure 101 using a pressure sensitive adhesive (PSA) film. In some embodiments, a channel may be machined or otherwise formed around the perimeter of the cover sheet 110 in which an adhesive may be introduced and used to bond the cover sheet 110 to the enclosure 101.

The cover sheet 110, depicted in FIG. 1A, is formed from a sapphire component having an overall thickness of less than 100 μm in one example. In some embodiments, the overall thickness of the cover sheet 110 is between approximately 0.05 mm and 1 mm. Moreover, the cover sheet 110 may be formed into a variety of non-sheet shapes, including components that have multiple features of different thicknesses.

The cover 110 may be formed from a single sheet of sapphire material or, alternatively, be formed from a laminate material made from multiple layers and having at least one layer formed from a sheet of sapphire. In the present example, the side of the cover sheet 110 that is external to the device may be finished to a smooth matte surface finish and may also include an anti-reflective or other type of coating to enhance the optical properties of the cover sheet 110.

Opposite to the exterior side of the cover sheet 110, an ink or paint may be applied to a perimeter portion to form a solid, opaque border that surrounds a center viewable portion of the cover sheet 110. The center portion of the cover sheet 110 may remain optically transmissive and may have a highly polished surface finish. In some implementations, the perimeter portion that is painted has a surface finish that is less polished than other portions of the cover sheet 110 in order to facilitate paint adhesion and/or bonding properties with other components of the device 100.

The enclosure 101 may define an opening in which the display 102 is positioned or disposed. The display 102 may include a liquid crystal display (LCD), organic light-emitting diode (OLED) display, or similar display element. Because the cover sheet 110 overlays the display 102, optical quality and physical strength are important aspects of the cover sheet's functionality. The cover sheet 110 may also be attached to, or be integrated with, a transparent electronic sensor that overlays the display 102. In some cases, the electronic sensor covers the entire display 102 and is used as the main input device for the user. In some implementations, the cover sheet 110 may be integrated with capacitive touch and force sensors used to detect finger or stylus touches on the surface of the cover sheet 110.

As shown in FIG. 1A, the front surface of the device 100 also includes a button sheet 120 used to protect the surface of the control button 104. In this example, the button sheet 120 is formed from a sapphire sheet and is used as an optically transmissive protective layer. The button sheet 120 protects the surface of the control button 104 and may have a highly polished surface finish. However, it is not necessary that the button sheet 120 be optically transmissive or have a polished surface that is as smooth as the cover sheet 110. For example, the button sheet 120 may be opaque and an outer surface of the button sheet 120 may have a polished surface finish that is adapted to provide a particular aesthetic appearance and/or tactile quality. For instance, the outer surface may have a high degree of polish to facilitate visibility of a graphical element or symbol printed on the control button 104 and/or to visibly distinguish the button sheet 120 from the cover sheet 110. The button sheet 120 may be formed as a flat sheet or may be formed as, or include, a contoured or curved surface.

The button sheet 120 may enhance the mechanical integrity of the control button 104, which is used as an input to the device 100. In the present example, the control button 104 includes a tactile switch which is operated by depressing the control button 104. The control button 104 may also include or be associated with an electronic touch sensor, such as a capacitive touch and/or force sensor, or biometric sensor. The button sheet 120 may be attached directly to an actuator or housing of the control button 104 and may, alternatively, be attached to or integrated with the electronic touch sensor of the control button 104.

In certain embodiments, the button sheet 120 depicted in FIG. 1A is formed from a sapphire sheet having an overall thickness of approximately 100 μm and, in some embodiments, between approximately 1.0 and 0.05 mm. Other thicknesses and dimensions are also envisioned. Similar to the cover sheet 110, the button sheet 120 may be formed from a single sheet of sapphire material or, alternatively, be formed from a laminate material having at least one layer formed from a sheet of sapphire. In some cases, the button sheet 120 is formed from the same material as the cover sheet 110, although this is not necessary. One or both sides of the button sheet 120 may also be printed or coated to enhance the optical properties of the sapphire component.

FIG. 1B depicts a back view of the device 100 having one or more protective covers formed from sapphire components. In this example, the back surface of the device 100 is substantially covered by a back sheet 130. Similar to the cover sheet 110, the back sheet 130 may be formed from a sapphire component and may be used as an optically transmissive protective layer. Also, similar to the cover sheet 110, the back sheet 130 may be formed from a single sheet of sapphire material or, alternatively, be formed from a laminate material having at least one layer formed from a sheet of sapphire. In some cases, the back sheet 130 is formed from the same material as the cover sheet 110, although this is not necessary. In this case, the back sheet 130 covers the entire back of the device 100, except for the area near the camera lens 105. A separate camera cover 140 may be used to protect the camera lens 105. The camera cover 140 may be formed as a flat sheet or as a contoured shape. The camera cover 140 may also be configured to function as an optical lens or other optical element. In an alternative embodiment, the back sheet 130 also covers the camera lens 105 and the separate camera cover 140 is not used.

Figure 2:
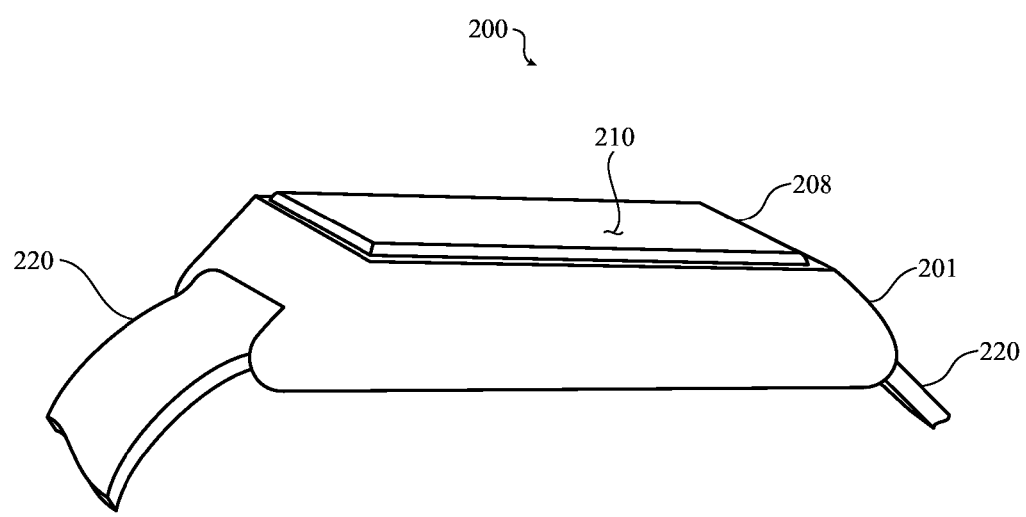
FIG. 2 depicts another example electronic device.

FIG. 2 depicts another example device 200 that includes a sapphire component. In particular, the device 200 is a wearable consumer product that includes a cover 210 formed from a sapphire component. In some embodiments, the device 200 is a wearable device, wearable electronic device, health monitoring device, and/or other wearable consumer product. The device 200 may also include non-electronic devices, such as a mechanical watch or other wearable product that includes a cover or component formed from a sapphire component.

Similar to the example covers described above with respect to FIGS. 1A-1B, the cover 210 of FIG. 2 may be formed from a sapphire material. Also similar to the previously described examples, the cover 210 may provide both structural or mechanical protection for the device 200, as well as high optical quality for viewing the display 208 or other visual element of the device 200. As described in more detail below, the cover 210 may be finished using a polishing process using a formulated slurry as described herein.

As shown in FIG. 2, the device 200 includes a body 201 having an opening. The display 208 is positioned or disposed within the opening, and the cover 210 is positioned or disposed over the display 208. Similar to the previous example, the display 208 may include a liquid crystal display (LCD), organic light emitting diode (OLED) display, electroluminescent (EL) display, or other type of display element. Because the cover 210 overlays or is disposed over the display 208, the optical quality, surface finish, material thickness, and/or physical strength of the component may be relevant aspects of the cover 210, alone or in conjunction with other such aspects. The cover 210 may also be attached to, or be integrated with, a transparent electronic sensor that overlays the display 208. In some cases, the electronic sensor covers the entire display 208 and serves as the main input for the device 200.

As shown in FIG. 2, the device 200 may also include an attachment component 220. The attachment component 220 may include a band or strap formed from a variety of materials, including cloth, synthetic fiber, polymer, metal, leather, and so on. The attachment component 220 may be configured to attach the device 200 to a body part of a user, such as the user's wrist or portion of the user's arm. In some embodiments, the attachment component 220 may also include a sapphire component used to protect one or more exterior surfaces.

Figure 3:
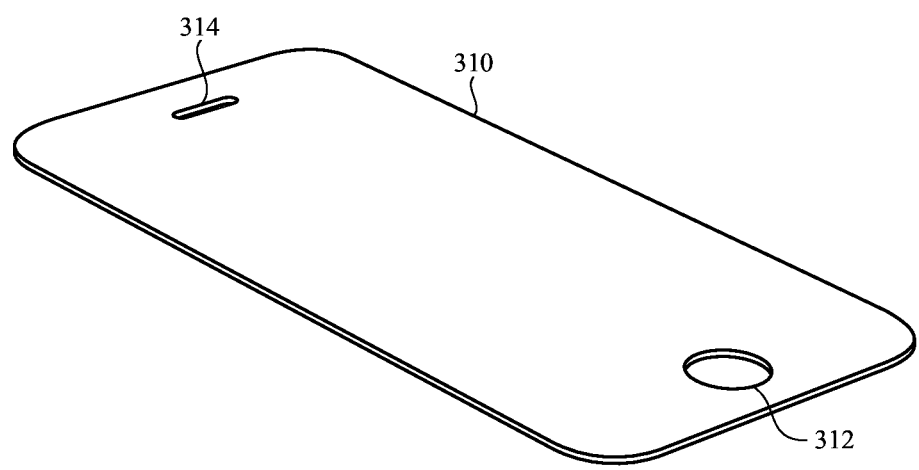
FIG. 3 depicts an example ceramic component suitable for use with the example electronic device of FIGS. 1A-B.

FIG. 3 depicts an example sapphire component 310 which may be finished using formulated slurry-based processes described herein. To simplify the following description, repeated reference is made to the example sapphire component 310 depicted in FIG. 3, which may correspond in geometry and other aspects to the front cover sheet 110 described above with respect to FIG. 1A. While the sapphire component 310 is provided as one example, the systems and techniques described below may also be used to treat or otherwise process other example covers described above (e.g., 110, 120, 130, 140, 210) as well as other sapphire-based components.

In the example of FIG. 3, the sapphire component 310 is formed from a sheet of sapphire material cut into a profile shape. Specifically, the sapphire component 310 is cut to substantially cover a surface of an electronic device (e.g., device 100 of FIG. 1). The sapphire component 310 also includes one or more internal features including, for example, button aperture 312 and speaker opening 314. The final profile shape and the internal features may be formed using a laser-cutting or other precision cutting operation.

Figure 4:
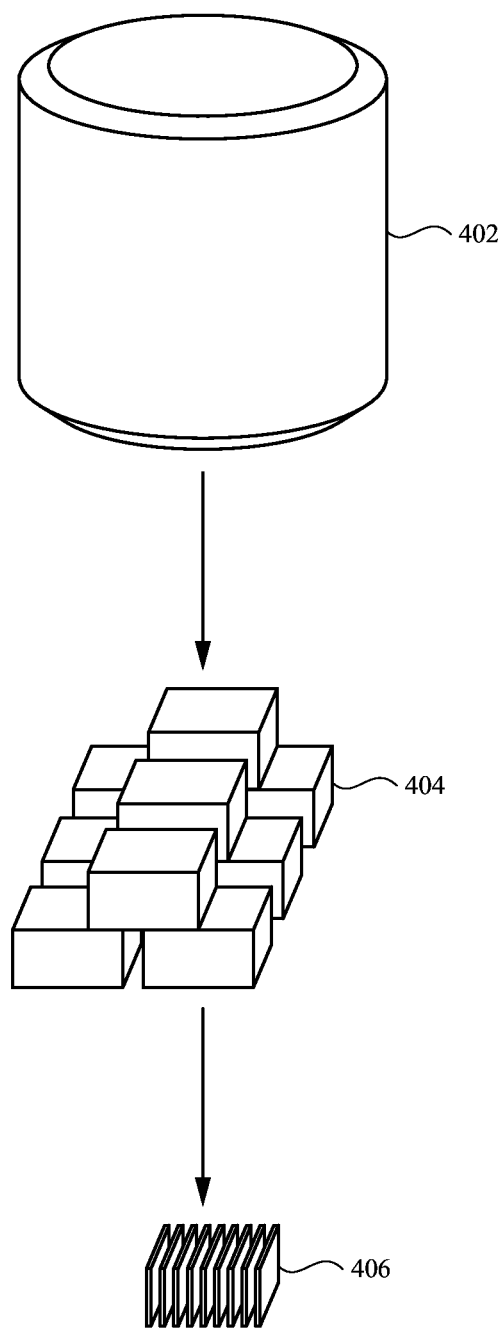
FIG. 4 depicts an example ceramic component suitable for use with the example electronic device of FIG. 2.

If the sapphire component 310 is formed from a synthetic sapphire material, the sapphire component may be formed using a sapphire fabrication process similar to the simplified example depicted in FIG. 4.

Figure 5:
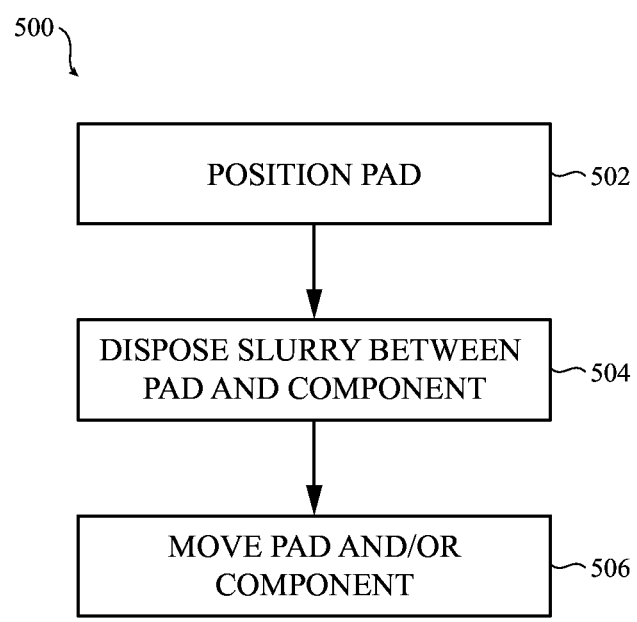
FIG. 5 depicts an example process for treating the surface of a ceramic component.

The examples of FIGS. 4 and 5 are provided with respect to a ceramic part that is formed from a sapphire material. However, the techniques and methods may also apply to components formed from other types of ceramic materials. As shown in FIG. 4, the manufacture of a ceramic component, such as a sapphire sheet, may begin with the formation of a crystal boule 402. The sapphire material may be grown as a single crystal or mono-crystalline structure using one of a variety of suitable techniques. For example, the boule 402 of sapphire material may be grown using a Verneuil method, Kyropoulous method, heat exchanger method (HEM), Czochralski method (CZ), edge-defined film-fed method, and so on. In some cases, the crystal formation process results in a boule 402 having an irregular shape and a crystalline structure orientation that may vary depending on the manufacturing process. While the boule 402 depicted in FIG. 4 is shown as having a substantially cylindrical shape, the boule 402 may, in some case, have a different or irregular shape or form.

In some embodiments, the boule 402 may be inspected and portions of the boule 402 may be identified as suitable for manufacturing a sapphire product. The acceptable portions of the boule 402 may be cut or cored from the boule 402 and formed into one or more bricks 404 of sapphire material. The bricks 404 may be cut from the boule 402 using an abrasive saw or other suitable cutting apparatus.

In some embodiments, the orientation of the crystalline structure of the boule 402 may be measured or determined prior to cutting the bricks 404. The measured crystal structure orientation may be used or referenced with cutting bricks 404 from the boule 402 to produce bricks 300 having a substantially rectilinear shape with one or more sides that are approximately aligned with the crystalline structure. In some cases, the bricks 404 are formed having a length that is generally perpendicular to the A-plane of the crystalline structure. This may appropriate when forming cover sheets or protective sheets for the exterior surface of a device. In some cases, the bricks 404 are formed having a length that is generally perpendicular to the C-plane of the crystalline structure. This may be appropriate when forming a sheet or part having particular electrical properties, including a stable dielectric constant, low dielectric loss, or good electrical insulation.

As shown in FIG. 4, one or more of the bricks 404 may be sliced to produce multiple sheets 406. For clarity, the sheets 406 depicted in FIG. 4 correspond to a single sliced brick 404. However, while not explicitly depicted, each of the bricks 404 shown in FIG. 4 may be similarly sliced into a set of sheets 406. In some implementations, the sheets 406 are cut to a thickness that is approximately the finished thickness of a sapphire component (e.g., a cover 310 of FIG. 3). Typically, the sheets 406 are slightly thicker to account for the loss of material during polishing and/or surface finishing processes. The sheets 406 may be cut using a wire saw, abrasive cutter or other similar slicing technique. In some cases, multiple sheets 406 are cut from a brick 404 at the same time using an array of wire saw blades or other cutting implements.

The sheet forming process depicted in FIG. 4 may be used to create individual blanks that may be further processed into covers or protective sheets to be installed or attached to an electronic device. In particular, one or more profile cutting operations, feature cutting operations, and surface finishing operations may be performed on the sheets 406 to form the final cover or protective sheet. In some cases, the sheets 406 are subjected to one or more rough lapping operations to achieve the desired flatness and approximate thickness. The lapping operations may remove some, but not necessarily all, of the roughness created by the slicing operation used to slice the sheets 406 from the bricks 404.

FIG. 5 depicts an example process 500 that may be used to finish a surface or region on a surface of a sapphire component 310. The process 500 may be used to improve the surface finish and/or reduce surface roughness of surfaces on a ceramic component. In particular, the process 500 may be used to produce a polished surface on a ceramic component. The process 500 may also remove artifacts or surface defects created by other manufacturing processes. For example, process 500 may be used to remove surface roughness, grooves, or other artifacts that result from slicing a sheet from a brick or boule of material, as described above with respect to FIG. 4.

In some cases, process 500 is proceeded by another polishing operation or other surface treatment operations. However, in some cases, process 500 is the main or only polishing process performed on the respective surface of the ceramic component. In some implementations, the polishing process 500 is the final polishing process performed on the respective surface of the ceramic component and is used to produce the highly polished surface that may be advantageous for some of the components and covers discussed above with respect to FIGS. 1A-3. In general, the sapphire component that is processed according to this process 500 may be used as a protective cover sheet on a device in accordance with the examples provided above with respect to FIGS. 1A-3. The processes can also be used to produce a sapphire part used in a variety of other applications, including structural laminates, optical plates, and the like.

For purposes of the following description, a sapphire component is described generally as an example ceramic component. However, process 500 may also be applied to other types of ceramics having various form factors. In the following examples, the sapphire component may include a sheet of sapphire material less than 3 mm thick and may be obtained from a variety of sources, natural and/or synthetic. In some cases, the sapphire component may be a laminate composite having multiple layers and at least one layer made from a sapphire material. Other layers in the sapphire laminate may include, for example, silicate glass, a polymer sheet, or additional layers of sapphire material.

FIG. 5 depicts a flow chart of operations for the example process 500 for performing a surface treatment on a sapphire component. The process 500 may be used to finish a surface region of a part such as the cover sheets 110, 120, 130, 140, 210, 310 described above, with respect to FIGS. 1A-3.

In operation 502, a pad is positioned with respect to a surface of a ceramic component or sheet. The pad may be placed adjacent or proximate to the surface of the ceramic component in preparation for a polishing operation. Depending on the implementation, the ceramic component may be placed in a fixture or jig and placed under a pad or within a system that is configured to polish the ceramic component. The pad may be placed directly on the surface to be polished or may be separated from the surface by a small gap.

The pad of operation 502 may be a compliant pad formed from a soft or compliant material. In some implementations, the compliant pad is formed from a polyurethane sheet, urethane sheet, rubber, or other natural or synthetic elastic material. The compliant pad may be formed from substantially solid or a closed- or open-celled foam material. The softness of the compliant pad may allow non-uniform or non-flat features to be polished using the process 500. The softness of the compliant pad may also provide compliance between the polishing apparatus and the slurry (introduced in operation 504 below). The compliance of the pad may also reduce localized forces or pressures that may be created by the slurry, which may cause damage or pitting to the surface as the ceramic component is being polished.

In operation 504, a slurry is provided or introduced to the surface of the ceramic component that is to be polished. Ultimately, a portion of the slurry will be disposed between the pad and the surface of the ceramic component. While operation 504 is described after operation 502, the slurry may be placed or disposed on the surface of the ceramic component either before or after the pad is positioned with respect to the surface. In some implementations, the slurry is provided using a low-pressure delivery system that injects or forces the slurry between the pad and the surface of the ceramic component. In some cases, the slurry is provided as part of a slurry recirculation system that delivers the slurry to the region being polished, collects the used slurry, and filters or otherwise prepares the slurry for re-use.

The slurry provided in operation 504 may be specifically formulated to produce a highly polished surface finish and reduce or minimize the polishing time needed to achieve the desired surface finish. In particular, the size of the particles of the abrasive and/or the pH level of the slurry may be adapted to increase or maximize the material that is removed in a polishing operation while reducing or minimizing damage that may be caused by the polishing particles. For example, if the particle size of the abrasive is too large, the slurry may cause pitting or other surface defects in the ceramic material. However, if the particle size is too small, the polishing operation may not be effective or may take too long to achieve the desired surface finish.

In some cases, the abrasive particles are formed from a material that is harder than the ceramic component. The abrasive particles or particulate may be formed from a diamond, alumina, or other similar material. The size of the particles may fall within a range that provides an improved polishing process, when combined with the high-pH liquid of the slurry. In some embodiments, the size of the particles suspended in the slurry is approximately 150 to 180 nm. In some cases, the size of the particles is greater than 120 nanometers but less than 200 nanometers. In some cases, the size of the particles ranges between 100 and 300 nanometers.

The abrasive particulate may be metallized or coated with a metal or metallic coating to improve the suspension properties of the particulate. In particular, the metal or metallic coating may decrease the particle adhesion or tendency of the particles to form clusters or groups, which may help maintain suspension of the particulate within the slurry. The metal or metallic coating may prevent the abrasive particles from adhering to each other and forming clumps or masses that may be more difficult to keep in suspension. The metal or metallic coating may also cover and reduce the sharpness of the particulate, which may also reduce to the potential for damage caused by the abrasive particles.

In some embodiments, the slurry introduced in operation 504 may include a specific size of abrasive particulate suspended in a high-pH or basic liquid component. The high-pH or basic liquid component may also be referred to herein as a softening agent. The high-pH level of the slurry liquid may soften the surface of the ceramic to improve the effectiveness of the suspended abrasive. In some cases, the pH of the liquid component of the slurry is greater than or approximately equal to a pH level of 10. In some cases, the liquid component of the slurry has a pH level that is greater than 10 and less than a pH level of 11.5. The high-pH level of the slurry may be formed or created by using a liquid or softening agent that includes a potassium hydroxide solution, a sodium hydroxide solution, or other similar chemical formulation. In some cases, the softening agent includes an etchant or other chemical agent that is adapted to facilitate the removal of material from the surface of the ceramic. The high-pH liquid or softening agent may soften the surface of the ceramic material, which may increase the rate of material removal caused by the slurry. Softening the ceramic material may also reduce the risk of damage or pitting caused by the polishing slurry.

The slurry of operation 504 may include particles having a generally spherical or rounded shape. In some embodiments, the slurry includes a particulate having a shape that is adapted to further improve the polishing process 500. For example, in some cases, the slurry may include particles that are star-shaped. A star-shaped particle may include a particle having multiple tips or protrusions that extend outwardly from a base or central portion. The tips or protrusions may have a substantially uniform distribution around the base or central portion. However, the tips or protrusions may not necessarily be symmetrically arranged around the base or central portion. Other potentially beneficial particle shapes include, for example, regular or irregular polygonal shapes, shapes with bumps, and/or shapes with sharp contours or features.

In operation 506, the pad and/or ceramic component are moved with respect to each other to polish the surface of the ceramic component. The movement may be an oscillating or reciprocating motion along the plane of the surface. The movement of the pad with respect to the surface of the ceramic component may force the abrasive slurry across the surface and drive the abrasive particulate against the surface. The movement and/or force provided by the pad may be tailored to accelerate or optimize the polishing process. In some embodiments, the ceramic component and/or the pad are placed in a fixture or jig that is coupled to a mechanism configured to articulate, translate, or otherwise move the two components with respect to each other. The polishing mechanism may be configured to shift one or both of the components in a lateral direction in an oscillating or reciprocating manner. The speed of the movement as well as the rate of oscillation may be variable and/or user configurable.

The mechanism, fixture, and/or jig may be configured to maintain a gap between the pad and the surface of the ceramic component. In some cases, the mechanism, fixture, and/or jig may be configured to apply a specific pressure or force between the pad and the surface of the ceramic component. The pressure or force may be variable and/or user configurable.

During operation 506, new slurry may be introduced between the pad and the surface of the ceramic component. The new slurry may either be fresh unused slurry or slurry that has been recirculated or recycled. In some embodiments, the abrasive slurry is collected. For example, the slurry may be passed over the surface of the ceramic component during polishing and collected at one or more ends of the ceramic. In some cases, the ceramic component is at least partially immersed in a bath of abrasive slurry during the polishing process and some of the slurry is withdrawn or extracted from the abrasive slurry bath.

The abrasive slurry that is collected may be processed or reformulated to refresh or enhance the properties of the abrasive slurry. For example, in some cases, additional abrasive particles may be added to the slurry. The additional abrasive particles may be introduced to replenish particles that may have come out of suspension or otherwise lost during an earlier polishing operation. The slurry refreshing operation may also include adding a solution having a pH greater than 10 to the abrasive slurry. Introducing the solution may boost the pH level of the slurry to help maintain a pH level of between (or equal to) 10 and 11.5. The solution may include, for example, a potassium hydroxide solution or a sodium hydroxide solution. Once the abrasive slurry has been processed or refreshed, the slurry may be reintroduced to the surface of the sapphire component to continue polishing the surface.

In some embodiments, the particulate concentration, the pH level, and/or other properties of the abrasive slurry are monitored using one or more sensors or devices as part of a recirculation system. For example, a recirculation system may include a pH meter configured to detect an ion concentration of the slurry and/or a particle sensor configured to detect an amount or concentration of suspended particles in the slurry. The sensed properties of the abrasive slurry may be used by a recirculation system to compute or estimate an amount of particulate and/or liquid agent do add in order to adjust the concentration of solid particles and/or the pH of the abrasive slurry. In some cases, the recirculation system includes a particle delivery and/or liquid agent delivery subsystems that is configured to add particles and/or liquid agent in response to the system estimates.

During a polishing process, fine ceramic (e.g., sapphire) particulate may begin to appear in the slurry over time. Excessive amounts of fine ceramic particulate may undermine or reduce the effectiveness of the slurry. In some cases, a coagulating agent and/or surfactant may be used to group or aggregate the fine ceramic particles into particle clusters or clumps of sapphire. The particle clusters or clumps may be formed into particles approximately 50-100 nm in size, which may facilitate their removal using a filtration or centrifuge particle removal system.

The filtration of the slurry may be performed as part of a slurry reuse or recirculation system. As discussed above, the slurry may be collected or extracted from a polishing process and refreshed or reformulated to help maintain the effectiveness of the polishing process. As part of the refreshing operation, the slurry may be filtered or centrifuged to remove unwanted particles or contaminants.

While process 500 is described above with respect to three discrete finishing operations, variations of the above-described process may also be performed. For example, in some cases, the slurry is provided throughout the polishing process 500. For example, operation 504 may be performed at the same time or overlapping times with the other operations 502 and 504. Process 500 may include other operations that are not expressly discussed including, for example, re-positioning of the pad and/or ceramic component. In some cases, the pad may be replaced one or more times during the process 500.

While any methods disclosed herein have been described and shown with reference to particular operations performed in a particular order, it will be understood that these operations may be combined, sub-divided, or re-ordered to form equivalent methods without departing from the teachings of the present disclosure. Accordingly, unless specifically indicated herein, the order and grouping of the operations are not a limitation of the present disclosure.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of polishing a sapphire component comprising:

positioning a compliant pad adjacent to a surface of the sapphire component;

disposing an abrasive slurry between the compliant pad and the surface; and moving the compliant pad and the sapphire component with respect to each other to produce a polished surface and to generate sapphire particulates suspended in the abrasive slurry;

forming clusters of the sapphire particulates in the abrasive slurry; and removing at least some of the clusters of the sapphire particulates from the abrasive slurry;

wherein:
the abrasive slurry comprises:
a liquid component having a pH level greater than 10;
abrasive particulates having a hardness greater than the sapphire component; and
a coagulating agent for the sapphire particulates.

2. The method of claim 1, wherein the abrasive slurry is introduced to the surface of the sapphire component prior to positioning the compliant pad.

3. The method of claim 1, wherein the compliant pad is formed from an elastic material.

4. The method of claim 1, further comprising:
translating the compliant pad in a reciprocating motion over the surface of the sapphire component.

5. The method of claim 1, further comprising:
cutting a brick of sapphire material from a synthetic boule;
slicing a sheet of sapphire material from the brick; and
lapping the sheet of sapphire material before disposing the abrasive slurry between the compliant pad and the surface.

6. The method of claim 1, wherein the abrasive particulates comprise diamond particles having a size ranging between 100 and 300 nanometers.

7. The method of claim 1, further comprising:
collecting the abrasive slurry;
introducing additional abrasive particulates to the abrasive slurry;
adding a solution having a pH greater than 10 to the abrasive slurry; and
reintroducing the slurry to the surface of the sapphire component.

8. The method of claim 7, wherein the solution comprises one or more of: a potassium hydroxide solution; or a sodium hydroxide solution.

9. A method of polishing a sapphire component comprising:
providing an abrasive slurry to a surface of the sapphire component; and
moving the sapphire component and a pad relative to each other to force the abrasive slurry across at least a portion of the surface to polish the surface and to generate sapphire particulates suspended in the abrasive slurry;
aggregating the sapphire particulates suspended in the abrasive slurry to form sapphire particle clusters; and
filtering the abrasive slurry to remove the sapphire particle clusters
wherein the abrasive slurry comprises:
an abrasive diamond particulate having a metallic coating; and
a softening agent configured to soften the surface of the sapphire component.

10. The method of claim 9, wherein the metallic coating reduces particle adhesion to maintain particulate suspension within the abrasive slurry.

11. The method of claim 9, wherein aggregating the sapphire particulate is performed by a coagulant in the abrasive slurry.

12. The method of claim 11, wherein the abrasive slurry further comprises a surfactant.

13. A method of polishing a sapphire component comprising:
applying an abrasive slurry to a surface of the sapphire component, the abrasive slurry comprising:
a liquid component having a pH level greater than 10;
abrasive particles having a hardness greater than the sapphire component; and
a coagulating agent for aggregating sapphire particulates;
moving the sapphire component and a pad relative to each other with the abrasive slurry applied across at least a portion of the surface to polish the surface and to generate sapphire particulates suspended in the abrasive slurry;
forming aggregates of the suspended sapphire particulates using the coagulating agent; and
removing the aggregates of the sapphire particulates from the abrasive slurry.

14. The method of claim 13, wherein forming aggregates includes forming clusters of sapphire particulates having a size between 50 nanometers and 100 nanometers.

15. The method of claim 13, wherein the abrasive particles include star-shaped diamond particles.

16. The method of claim 13, wherein the abrasive particles have a size between 100 nanometers and 300 nanometers.

17. The method of claim 13, wherein the abrasive particles are coated with a metal.

18. The method of claim 13, wherein the liquid component comprises one or more of a potassium hydroxide solution and a sodium hydroxide solution.

19. The method of claim 13, wherein the aggregates are removed using a centrifugal particle removal system.

20. The method of claim 13, further comprising adding a solution having a pH greater than 10 to the abrasive slurry after collecting the abrasive slurry to maintain the pH level between 10 and 11.5.

* * * * *